United States Patent
Sheahan, Jr. et al.

(10) Patent No.: US 9,643,716 B2
(45) Date of Patent: May 9, 2017

(54) AIR VEHICLE, ACTUATOR ASSEMBLY AND ASSOCIATED METHOD OF MANUFACTURE

(71) Applicant: The Boeing Company, Chicago, IL (US)

(72) Inventors: James Joseph Sheahan, Jr., Hazelwood, MO (US); Donald V. Drouin, Jr., O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 14/242,088

(22) Filed: Apr. 1, 2014

(65) Prior Publication Data

US 2015/0274280 A1    Oct. 1, 2015

(51) Int. Cl.
*B64C 9/02* (2006.01)
*B64C 13/34* (2006.01)
(Continued)

(52) U.S. Cl.
CPC ............... *B64C 13/34* (2013.01); *B64C 9/00* (2013.01); *B64C 9/02* (2013.01); *B64C 13/26* (2013.01);
(Continued)

(58) Field of Classification Search
CPC .. B64C 9/00; B64C 9/02; B64C 13/24; B64C 13/26; B64C 13/28; B64C 13/34; B64C 13/38; B64C 13/50
See application file for complete search history.

(56) References Cited

U.S. PATENT DOCUMENTS

| 1,846,965 A | * | 2/1932 | Hall ........................ B64C 9/00 244/90 R |
| 2,152,033 A | * | 3/1939 | Dornier .................... B64C 9/02 244/215 |

(Continued)

FOREIGN PATENT DOCUMENTS

EP    2 476 613 A2    7/2012

OTHER PUBLICATIONS

Search Report for European Application No. EP 15 15 0881 dated Aug. 11, 2015.
(Continued)

*Primary Examiner* — Tien Dinh
*Assistant Examiner* — Michael A Fabula
(74) *Attorney, Agent, or Firm* — Alston & Bird LLP (57) ABSTRACT

An air vehicle, an actuator assembly and a method of manufacture are provided in order to incorporate the actuator assembly within the outer mold line of the air vehicle. In regards to an air vehicle, the air vehicle includes a primary structure and a movable structure configured to be controllably moved relative to the primary structure. The air vehicle also includes an actuator assembly configured to cause the movable structure to be positioned relative to the primary structure. The actuator assembly includes an actuator housing and an actuation mechanism. The actuation mechanism is at least partially disposed within the actuator housing and is configured to provide for relative movement between the primary structure and the movable structure. At least a portion of the actuator assembly is built into at least one of the primary structure and the movable structure so as to be within an outer mold line of the air vehicle.

15 Claims, 4 Drawing Sheets

(51) Int. Cl.
  *B64C 9/00*    (2006.01)
  *B64C 13/26*   (2006.01)
  *B64C 13/38*   (2006.01)
  *B64C 13/40*   (2006.01)
  *B64C 13/50*   (2006.01)

(52) U.S. Cl.
  CPC .............. *B64C 13/38* (2013.01); *B64C 13/40* (2013.01); *B64C 13/50* (2013.01); *Y02T 50/32* (2013.01); *Y02T 50/44* (2013.01); *Y10T 29/49826* (2015.01)

(56) References Cited

U.S. PATENT DOCUMENTS

| | | | | |
|---|---|---|---|---|
| 2,870,748 A * | 1/1959 | Hemphill | ................ | B64C 13/40 244/226 |
| 2,932,473 A * | 4/1960 | Kass | ........................ | B64C 9/02 16/276 |
| 3,036,473 A * | 5/1962 | Geyer | ..................... | B64C 13/24 160/188 |
| 3,146,973 A * | 9/1964 | Ernst-Gunter | ............ | B64C 9/02 244/87 |
| 3,731,546 A * | 5/1973 | MacDonald | ............ | B64C 13/00 244/87 |
| 3,756,089 A * | 9/1973 | Haladay | .................. | B64C 13/24 16/367 |
| 3,883,093 A * | 5/1975 | Violleau | ................... | B64C 9/02 244/123.6 |
| 4,688,744 A * | 8/1987 | Aldrich | ................... | B64C 13/28 244/213 |
| 4,691,582 A * | 9/1987 | Weyer | ................ | B60G 21/0553 244/99.7 |
| 4,695,014 A * | 9/1987 | Mourani | ................. | B64C 13/34 244/213 |
| 4,721,016 A * | 1/1988 | Burandt | .................. | B64C 13/34 475/342 |
| 4,971,267 A * | 11/1990 | Fulton | .................... | B64C 13/24 244/99.9 |
| 4,979,700 A * | 12/1990 | Tiedeman | ................ | B64C 13/34 244/198 |
| 5,558,299 A * | 9/1996 | Veile | ......................... | B64C 3/56 244/131 |
| 5,628,477 A * | 5/1997 | Caferro | ..................... | B64C 9/02 244/195 |
| 7,600,297 B2 * | 10/2009 | Gitnes | ....................... | B64C 3/56 16/331 |
| 8,876,473 B2 * | 11/2014 | Westergaard | ........... | F03D 1/065 416/23 |
| 2003/0080246 A1 * | 5/2003 | Koizumi | ................... | B64C 9/02 244/99.3 |
| 2006/0243864 A1 * | 11/2006 | Ambrose | ................... | B64C 9/02 244/213 |
| 2007/0152098 A1 | 7/2007 | Sheahan, Jr. et al. | | |
| 2008/0258015 A1 * | 10/2008 | Thanhofer | ................ | B64C 9/02 244/224 |
| 2009/0159755 A1 * | 6/2009 | Gonzalez Gozalbo | ... | B64C 9/02 244/215 |
| 2009/0256025 A1 * | 10/2009 | Verde Preckler | ......... | B64C 5/18 244/87 |
| 2010/0019083 A1 * | 1/2010 | Llamas Sandin | ......... | B64C 9/00 244/99.14 |
| 2013/0320152 A1 * | 12/2013 | Parker | ....................... | B64C 9/02 244/90 A |
| 2015/0217855 A1 * | 8/2015 | Davies | .................. | B64C 13/503 244/99.13 |
| 2015/0276029 A1 * | 10/2015 | Marvin | ................. | F16H 25/205 74/89.29 |

OTHER PUBLICATIONS

European Search Report for Application No. EP 15 15 0881 dated Aug. 11, 2015.

* cited by examiner

AIR VEHICLE, ACTUATOR ASSEMBLY AND ASSOCIATED METHOD OF MANUFACTURE

TECHNOLOGICAL FIELD

An example embodiment of the present disclosure relates generally to an air vehicle that includes an actuator assembly and, more particularly, an air vehicle that includes an actuator assembly built into at least one of a primary structure and a movable structure so as to provide for controlled positioning of the movable structure relative to the primary structure.

BACKGROUND

Air vehicles, such as aircraft, rotorcraft, weapon, spacecraft or the like, often include a plurality of movable structures, such as control surfaces or other structures that are configured to be controllably moved and repositioned. For example, an aircraft may include a plurality of control surfaces that may be individually repositioned in order to perform controlled maneuvers to maintain the flight of the aircraft and/or to improve performance, such as by improving lift and lift trim, flow control, aircraft level flight trim, aircraft passive and active stability or internal volume change, reducing drag, defining the shock position, defining the center of pressure, delaying separation and stall, vectoring of thrust, altering the maximum speed or the like. Other examples of movable structures include actuated doors, aircraft components configured to fold, warp or twist and other movable structures such as a wing fold, a moving stabilizer, a weapons bay door, a gear door, an outer mold line (OML) shape, an expandable volume, an inlet bump/ramp, an inlet lip, a canopy, a swing wing, an adaptive/morphing structure, a fin, a helicopter blade, etc. The movable structures may be moved, reshaped, reoriented, or repositioned for various purposes, as descried above.

In order to controllably reposition a control surface, a door, OML shape, or other movable structural component or surface, an air vehicle may include a plurality of actuators with one or more actuators associated with each movable structure. The actuators may be commanded, such as by a pilot, a flight control computer or otherwise, in order to reposition the respective movable structure to a desired position, shape or orientation.

Each actuator generally includes an actuator housing that will be attached to a primary or reference structure, such as a wing of the air vehicle, and one or more linear or rotary actuation mechanisms, gears, and linkages that are at least partially composed within the actuator housing and operably connected to the movable structure. As such, the actuation mechanism provides for a controlled positioning, e.g., position, shape, and/or orientation, of the respective movable structure, such as in response to control signals provided by the pilot, the flight control computer or otherwise. However, to meet system design, certification, and performance requirements, the design, build, attachment and installation of the actuator housing to the primary structure may be labor intensive, heavy, large and expensive. Moreover, an actuator housing and mechanism that satisfies multiple system requirements, such as rate, loads, stiffness, deflection, etc., and is mechanically mounted to the primary or secondary structure may require altering the outer mold line of the air vehicle which, in turn, may disadvantageously affect the performance of the air vehicle. In addition, a larger and heavier actuation system design also impacts the performance of the air vehicle and the space available for other aircraft systems and fuel.

BRIEF SUMMARY

An air vehicle, an actuator assembly and a method of manufacture are provided according to example embodiments of the present disclosure in order to provide for an aircraft structure and an integrated actuator design and assembly that has improved performance, e.g., stiffness, rates, deflection, etc., weight, size and cost, and is within the outer mold line of the air vehicle. In this regard, the air vehicle, actuator assembly and method of manufacture and build of an example embodiment provide a structurally more efficient integration by integrating the actuator housing, the transmission, if any, and, in some embodiments, the actuation mechanism (e.g., gears, linkages, joints, pivots, crank arms, etc.) into the airframe structure in contrast to the mechanical attachment of an actuator housing to the airframe at discrete attach points. The integrated actuator assembly of an example embodiment provides for improved reaction load paths since the entire aircraft structure is reacting out internal loads as well as improved stiffness characteristics and geometric efficiencies relative to the mechanical attachment of an actuator housing to the airframe at discrete attach points. In addition, the integrated actuator assembly of an example embodiment may be more compact and take up less space relative to the redundant structure, discrete attach points and access requirements of a conventional actuator assembly. This more weight efficient compact integrated design may enable smaller and thinner shapes which may provide space for other systems or fuel as well as providing increased capabilities and performance. The benefits offered by embodiments of the air vehicle, actuator assembly and method of manufacture and build may lead to improved overall system performance, e.g., range, survivability, flight envelope, etc. since the outer mold line was not interrupted by the actuator assembly, more fuel may be carried, the aircraft weight may be reduced and/or the actuator assembly may be stiffer. Integrating the actuator assembly as part of the primary and secondary airframe structure will also enable innovative and more cost effective and efficient build and assembly approaches and processes.

In an example embodiment, an air vehicle is provided that includes a primary structure, such as at least one of a wing, a stabilizer, a vertical tail or an airframe body, and a movable structure configured to be controllably moved relative to the primary structure. The air vehicle of this embodiment also includes an actuator assembly configured to cause the movable structure to be positioned relative to the primary structure. The actuator assembly includes an actuator housing and an actuation mechanism, such as at least one of a linear and/or rotary hydraulic or electromechanical actuator. The actuation mechanism is at least partially disposed within the actuator housing and is configured to provide for relative movement, such as translating, sweeping and/or rotating movement, between the primary structure and the movable structure. In accordance with this embodiment, at least a portion of the actuator housing and actuation mechanism is built into at least one of the primary structure and/or the movable structure so as to be within an outer mold line of the air vehicle. As such, an overall more efficient, affordable and higher performance design may be provided.

The different portions of the actuator assembly may be built into either or both the primary structure and the movable structure. For example, the actuator housing, such as a rotary actuator housing, or the transmission of the actuation mechanism may include first and second pluralities of the actuator housing and actuation mechanism. Portions of the first and second pluralities of the actuator housing and actuation mechanism may be built into the primary structure and the movable structure, respectively. Other portions of the first and second pluralities of the actuator housing and actuation mechanism may mesh with one another. The first and second pluralities of the actuator housing and actuation mechanism of this example embodiment may define a gear housing and a motor operably connected to the gear housing and configured to cause movement of the movable structure relative to the primary structure.

In another embodiment, an actuator assembly is provided for an air vehicle having a primary structure and a movable structure, such as at least one of a gear door, a weapons bay door, a bi-fold doors, a canopy, an access door, etc. in a wing or an airframe body, configured to be controllably positioned relative to the primary structure. The actuator assembly includes an actuator housing and an actuation mechanism, such as at least one of a linear and/or rotary hydraulic or electromechanical actuator. The actuation mechanism is at least partially disposed within the actuator housing and is configured to provide for relative movement, such as translating, sweeping and/or rotating movement, between the primary structure and the movable structure. In accordance with this embodiment, at least a portion of the actuator assembly, e.g., at least a portion of the actuator housing and/or the actuation mechanism, is built into at least one of the primary structure and/or the movable structure so as to be within an outer mold line of the air vehicle, thereby providing an overall more efficient, affordable and higher performance design.

The different portions of the actuator assembly may be built into either or both the primary structure and the movable structure. For example, portions of the actuator housing, such as a rotary actuator housing or transmission housing, or portions of the actuation mechanism, such as the transmission and motor of the actuator may include first and second pluralities of the actuator housing and actuation mechanism. Portions of the first and second pluralities of the actuator housing and actuation mechanism may be built into the primary structure and the movable structure, respectively. Other portions of the first and second pluralities of the actuator housing and actuation mechanism may mesh with one another. The first and second pluralities of the actuator housing and actuation mechanism of this example embodiment may define a gear housing and the actuation mechanism may include a motor operably connected to the gear housing and configured to cause movement of the movable structure relative to the primary structure.

In a further embodiment, a method of forming an actuator assembly of an air vehicle is provided that includes building at least a portion of an actuator housing into at least one of a primary structure and a movable structure such that the actuator housing is within an outer mold line of the air vehicle. The method also includes at least partially disposing an actuation mechanism, such as at least one of a linear or rotary actuator utilizing a hydraulic or electromechanical source for actuation, within the actuator housing. The method further includes operably coupling the actuation mechanism to the movable structure such that the actuation mechanism is configured to cause the movable structure to be positioned relative to the primary structure, such as in accordance with a translating, sweeping and/or rotating movement. As such, the method of an example embodiment may form an actuator assembly having an overall more efficient, affordable and higher performance design.

The primary structure may include at least one of a wing, outer wing section, an inlaid tail or control surface (part of wing or fuselage OML), a vertical tail, a horizontal tail, a canted tail, a canard, a fin, a rotorblade or an airframe body. In one embodiment, the method may build different portions of the actuator housing, such as a rotary actuator housing and, in some embodiments, the rotary transmission, into both the primary structure and the movable structure. For example, in an instance in which the actuator housing, such as a rotary actuator housing and/or transmission housing, or portions of the actuation mechanism, such as the transmission and motor of the actuator includes first and second pluralities of the actuator housing and actuation mechanism, the method may build portions of the first and second pluralities of the actuator housing and actuation mechanism into the primary structure and the movable structure, respectively. In this embodiment, the method may also include positioning the primary structure and the movable structure relative to one another such that other portions of the first and second pluralities of the actuator housing and actuation mechanism mesh with one another. In this regard, the first and second pluralities of the actuator housing and actuation mechanism may define a gear housing and the actuation mechanism may include a motor operably connected to the gear housing and configured to cause movement of the movable structure relative to the primary structure.

BRIEF DESCRIPTION OF THE DRAWINGS

Having thus described aspects of the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 1:
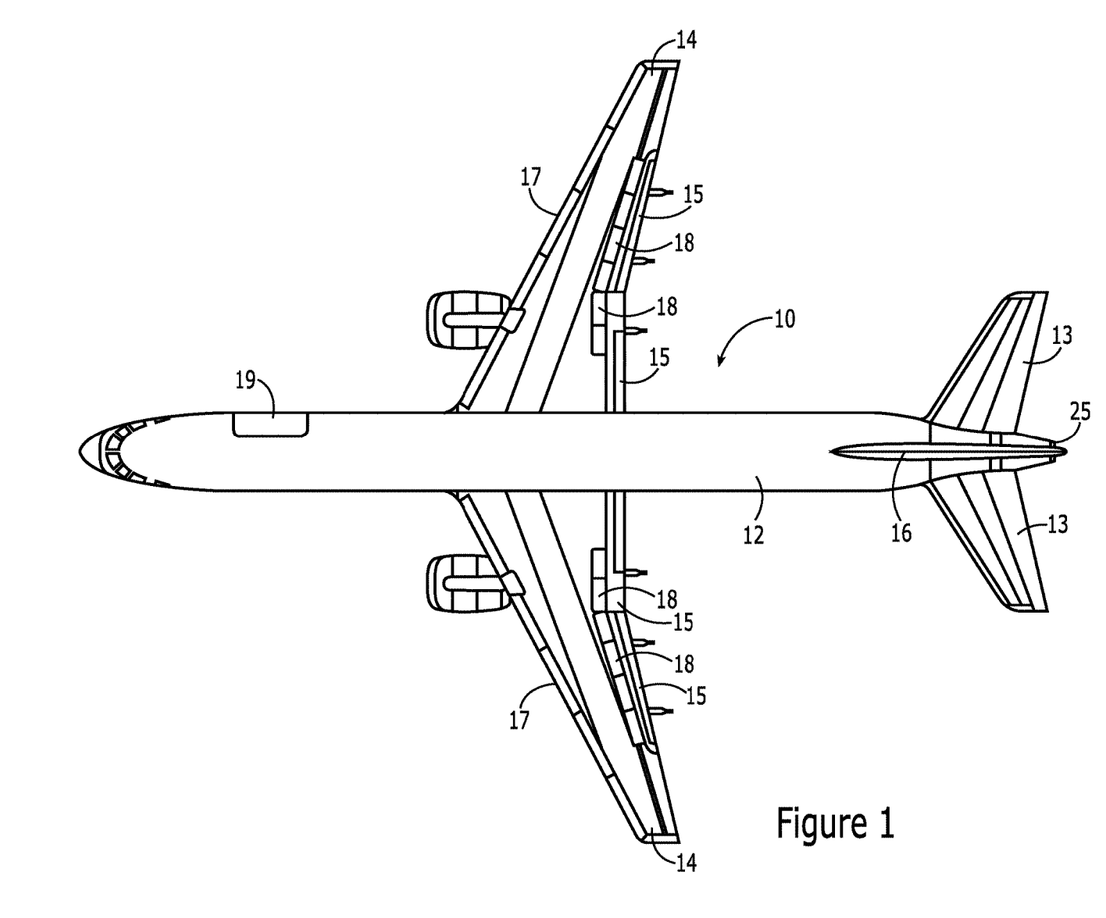
FIG. 1 is a top view of an air vehicle that includes a plurality of fixed surfaces, such as fuselage, wing, horizontal/canted tails, vertical tails, canards, etc., and a plurality of movable structures, such as leading edge and trailing edge control surfaces, rudders, horizontal/canted tails, vertical tails, trailing edge trim tabs, spoilers, translating/rotating flaps, speed brakes, doors, morphing OML shape, etc., that can be controlled via an integrated actuator system in accordance with an example embodiment of the present disclosure.
Figure 2:
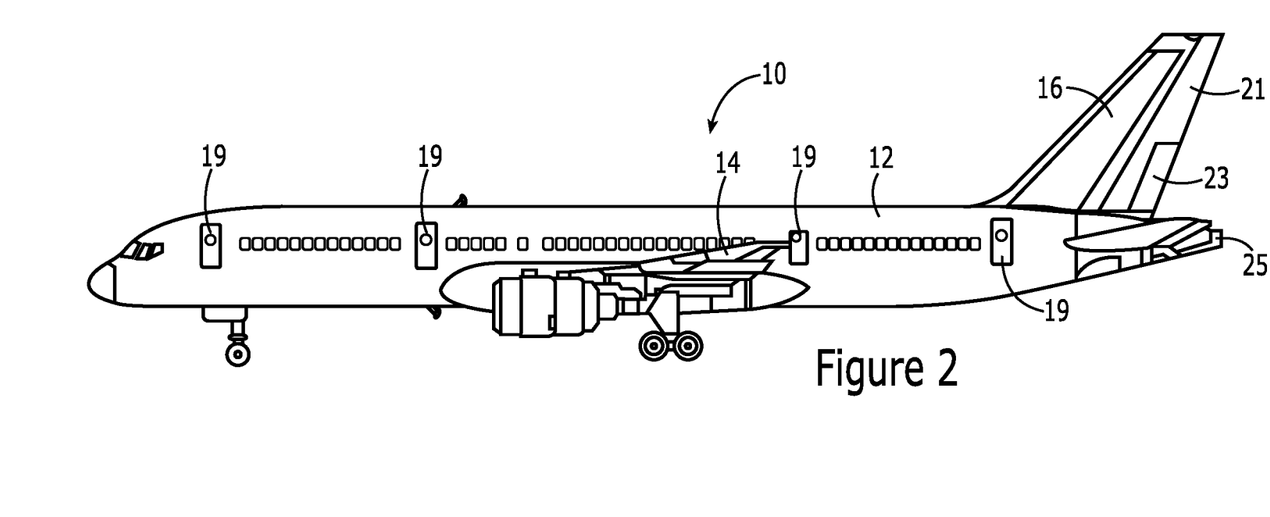
FIG. 2 is a side view of an air vehicle that illustrates additional movable structures.

Referring now to FIGS. 1 and 2, an air vehicle 10 is depicted. The air vehicle of the illustrated embodiment is an aircraft. However, the air vehicle may be a different type of air vehicle, such as a spacecraft, rotorcraft, unmanned air vehicle, missile or other weapons, in other embodiments.

The air vehicle 10 includes a plurality of primary structures that are configured to remain in a fixed position relative to one another. Examples of primary structures include the airframe body, e.g., fuselage 12, the wings and wing tip 14, the vertical tail 16, the horizontal/canted tails 13, and the like. The air vehicle also includes a plurality of movable structures. While movable structures may serve a variety of purposes, the movable structures may be controllably positioned so as to provide for control over the aerodynamic characteristics of the air vehicle. The movable structures are configured to be controllably repositioned relative to a respective primary structure. By way of example, a wing 14 may include leading edge control surfaces 17, trailing edge control surfaces 15, e.g., trailing edge flaps, elevons and/or elevators, moving wing tip 14, and spoilers 18, and/or a fixed or moving vertical tail 16 may include one or more rudders 21 and trim tabs 23 that may be controllably positioned relative to the vertical tail 16 or the fuselage 12 in order to control the aerodynamic characteristics of the air vehicle. The air vehicle may also include other control surfaces such as a fixed or all moving horizontal/canted tail 13 with separate moving surfaces and trim tabs. The air vehicle may also include other movable structures including actuated doors 19, the thrust vectoring aft nozzle 25 or other vectoring nozzle, a wing fold, an all moving horizontal or vertical tail, a speed brake, thrust reversers, a weapons bay door, a gear door, an engine door, an inlet ramp, an inlet lip, a canopy, a swing wing, a folding wing/wing-tip, an adaptive structure, a fin, a helicopter blade, etc. Another example of a movable structure is a morphing surface, such as a portion of the OML, i.e., skin, that is configured to change shape. Examples of morphing surfaces include wing or tail shape (wing camber, twist, etc.), a bump or ramp as part of an inlet system to control the shock and incoming flow, a weapons bay door bump that expands to allow larger weapons, a wing or fuselage skin that bumps to control air flow or to expand internal volume for fuel, etc.

The movable structures may be configured to be repositioned relative to a respective primary structure by an actuator assembly that extends between the primary structure and the movable structure. The actuator assembly may be commanded move in a particular manner and, as such, may correspondingly cause the movable structure to which the actuator assembly is coupled to move to a desired position. The movable structure movement will be 1 or more combinations of translation and rotation covering all 6 degrees of freedom (DOF) relative to the primary structure. The actuator assembly may be commanded in various manners including by flight commands provided by a pilot or other operator, by a flight control computer or the like. The flight commands may be mechanical commands provided via linkages or electronic commands, such as employed in a fly by wire system.

Figure 3:
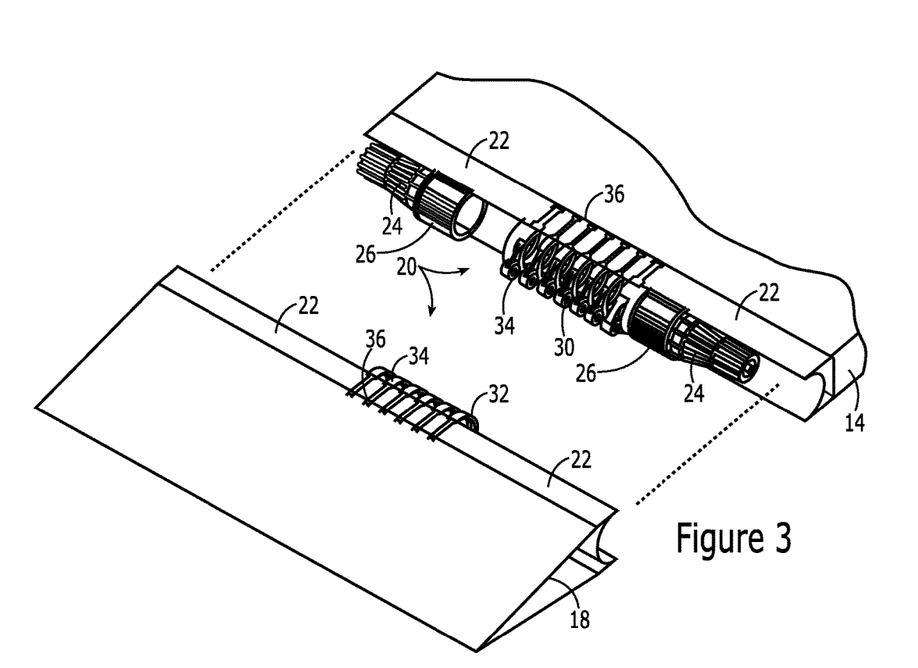
FIG. 3 is an exploded perspective view of a primary structure, such as a wing, and a movable structure, such as a flap, and portions of an actuator assembly having portions of the actuator housing manufactured and built into both the primary structure and the movable structure in accordance with an example embodiment of the present disclosure.
Figure 4:
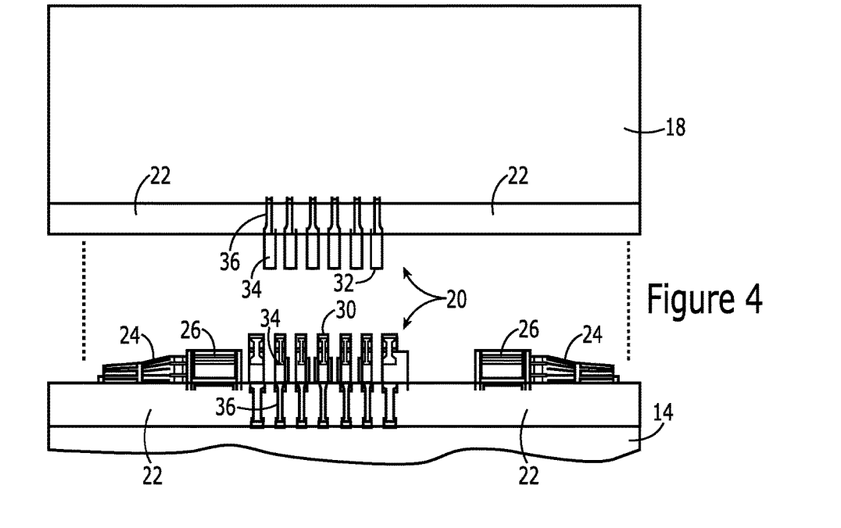
FIG. 4 is a exploded top view of the primary structure, the movable structure and the actuator assembly of FIG. 3.

As shown in FIGS. 3 and 4 and in accordance with an example embodiment of the present disclosure, the actuator assembly is positioned within the outer mold line of the air vehicle 10. In the illustrated embodiment, the actuator assembly, namely, a rotary actuator assembly, is positioned between a primary structure 14, such as a wing, and a movable structure 18, such as a control surface, e.g., a flap, and in general alignment with the rotation axis of the movable structure. As will be described below, the actuator assembly including the actuator housing 22 and at least part or all of the actuation mechanism 20 is built into the primary structure and/or the movable structure. In other words, the manufacturing and building of the aircraft structure in accordance with an example embodiment includes the integration of the actuator assembly including the actuator housing and/or the actuation mechanism within the aircraft structure in comparison to conventional techniques that include the discrete mechanical attachment of separate actuator housing to the aircraft structure. For example, an actuator housing 22 including parts of the actuator mechanism 20 may be an integral manufactured part of a wing spar or rib as opposed to being a separate housing mechanically attached at discrete points to the spar or rib. As such, the integrated actuator assembly is more structurally efficient, compact, lighter weight and lower cost. The integrated actuator assembly also has improved performance including improved stiffness, geometric efficiencies for improved rates and deflections and improved load paths. Thus, the integrated actuator assembly may fit within the outer mold line, may enable thinner and/or smaller shapes and/or free up space for other systems or fuel. Consequently, the integrated actuator assembly does not alter the outer mold line of the air vehicle and, consequently, also does not alter the aerodynamic characteristics of the air vehicle.

In general, the actuator assembly may primarily include an actuator housing and an actuation mechanism. The actuator mechanism is fully or partially contained within the actuator housing. In some cases the actuator assembly may be in 2 or more separate actuator housings, rather than a complete single housing. For example the actuator housing may be made up of separate valve/piston/motor housing and transmission housing. The actuator assembly may include various types of actuation mechanisms, such as a linear hydraulic actuator, a rotary hydraulic actuator, a linear electromechanical actuator, a rotary electromechanical actuator or a hybrid thereof. The electromechanical actuator includes an electric motor drive source. The actuation mechanism may include the control/sensor electronics, valves/piston and valve/piston assembly, motor and motor assembly, gearing system, e.g., transmission assembly, hinges and rods/linkages/cranks assembly, which sometimes can be part of the same single unit or separate units. In some embodiments, the actuation mechanism may include an integral or separate actuator transmission or gearing system including, for example, transmission housing, drives, shafts/axles, hinges, brakes, gears, bearings, outer rings and gear rings, planetary-type gears, screw gears, and other connective parts such as hinges, rods, links, pivots, cranks, or the like, that is configured to generate relative translation and/or rotation motion and position between the primary structure and the movable structure up to 6 DOF. In some embodiments, the actuation mechanism may convert a linear actuation to a rotary actuation, a rotary actuation to a linear actuation (as provided by a screw actuator that spins a threaded rod that moves the actuation linearly) and/or to gear up or down the linear or rotary actuation, e.g., by trading rate versus displacement and power. For example, an actuator may include a linear mechanism that produces a linear motion that is converted by the actuator transmission into a rotating motion. A rotary actuator may also include a motor source that is connected to a rotary transmission with the transmission, the motor or both integrated into the structure as described herein. Actuation power source may be provided by a central hydraulic source at the engine, a remote electromechanical source (electric motor), an electromechanical source integrated with the actuator, or a hybrid hydraulic source, e.g., a motor runs a separate hydraulic pump close to each actuator or as part of the actuator assembly.

In the embodiment illustrated in FIGS. 3 and 4, for example, the electromechanical rotary actuation mechanism 20 is fully or partially integrated into the actuator housing 22 that is an integral part of the primary structure 14 and movable structure 18. The electromechanical rotary actuation mechanism of the illustrated embodiment includes a pair of motors and motor gears 24 (partially shown) mounted in a motor case/housing 26 (partially shown) to opposite ends of the actuator assembly 20 within the actuator housing 22, and aligned along the rotation axis of the movable structure. The motor and motor assembly is primarily part of the primary structure 14 of the illustrated embodiment, but can also be fully or partially part of the movable structure 18. The rotary actuation mechanism 20 of the illustrated embodiment also includes a gearing system, e.g., transmission assembly, including multiple gears (not shown), multiple outer gear rings 30 for the primary structure, complimentary outer gear rings 32 for the movable structure 18, and a shaft (not shown) that is engaged by the motor(s) and extends through the actuator housing. The rotary actuation mechanism 20 of the illustrated embodiment is aligned along the rotation axis of the movable structure. The gearing system operably engages the movable structure, such as by operably engaging the portion of the actuator housing that is built into or otherwise connected to the movable structure 18, so as to controllably position the movable structure relative to the primary structure 14.

At least a portion of the actuator housing 22 and/or the actuation mechanism 20 may be manufactured and built into the primary structure and/or the movable structure. In the illustrated embodiment, portions of the actuator housing 22 and the actuation mechanism 20 may be built into both the primary structure and the movable structure. However, a portion of the actuator housing and/or the actuation mechanism may be built into only one of the primary structure or the movable structure in other embodiments. By way of example, however, the rotary actuator housing 22 of FIGS. 3 and 4 includes first and second pluralities of electromechanical rotary actuation mechanism 20. Although the actuator housing and actuation mechanism may be configured in various manners, the actuator housing and actuation mechanism of FIGS. 3 and 4 include a first plurality of rings 32 and a second plurality of planetary, epicyclic or other form of gears 30. Each of the rings and the gears are spaced apart from one another in an axial direction and the first plurality of rings and the second plurality of gears are configured to mesh or interlace with one another so as to define the actuator housing within which the actuation mechanism is at least partially disposed. In accordance with this example embodiment, portions of the first plurality of rings 32 are manufactured and built into the movable structure, while portions of the second plurality of gears 30 are manufactured and built into the primary structure. In this regard, each gear and ring may include a housing member 34 and an extension 36 that extends outwardly therefrom. While the housing members may be configured to be aligned with one another in the axial direction so as to define the actuator housing, the extensions of the gears and rings may be manufactured and built into the primary or movable structure.

A portion of the actuator housing 22 and/or the actuation mechanism 20 may be built into the primary or movable structure in various manners. With reference to the example of FIGS. 3 and 4, the halves of a planetary-type gear system, that is, the rings 32 and the gears 30, that form the actuator housing can be installed such that each ring 32 is machined as part of the surface hinge structure of the movable structure 18 and each gear 30 is machined as part of the main spar framing of the primary structure 14. Similarly the motor case/housing 26 may also be machined as part of the main spar framing of the primary structure 14. Thus, the motor casing, rings and gears may be mated by installing the movable structure to the primary structure. Once mated, the drive motors, other gearing, and shaft may be installed such that the actuator is assembled in place.

While the integration of a rotary actuator housing illustrated in FIGS. 3 and 4 is one example, another example includes a linear actuator housing being built into a wing rib and spar. A further example includes a linear or rotary actuator being built into a fuselage and connected to the movable structure via an axle, shaft and/or spline through a rotary transmission integrated into a spar of the primary structure and moveable structure. In other words, the actuator housing for the motor or piston is separate from the actuator transmission, e.g., gear system. Alternatively, the actuator housing including the motor and the transmission housing may both be integrated in the spar.

As another example of aircraft components illustrated by FIGS. 1 and 2, in an instance in which the primary structure is a wing 14 and the movable structure is a control surface, such as a leading edge control surface 17, a trailing edge control surface or flap 15 or a spoiler 18, the wing and the control surface may include a plurality of ribs that extend fore and aft in a streamwise direction between leading edge and the trailing edge and a plurality of spars that extend laterally in a spanwise direction from the fuselage to the wing tip so as to be generally perpendicular to the ribs. The wing and the control surface may also include a skin placed over the ribs and spars and secured thereto. As such, the wing and the control surface define a plurality of internal cavities generally bounded by the ribs, the spars and the skin. In an example embodiment, portions of the actuator housing 22 may be manufactured and built into the wing and the control surface by forming or machining the actuator housing or at least a majority of the actuator housing into the wing or control surface.

For example, the primary structure and/or the movable structure may be machined in such a manner as to define the actuator housing 22 or at least a portion of the actuator housing such that the actuation mechanism 20 may thereafter be disposed at least partially within the actuator housing. In this example, the primary structure and/or the movable structure may be a monolithic piece of material that is machined such that the actuator housing or at least a portion of the actuator housing is defined by and formed within the primary structure and/or the movable structure. By machining the primary structure and/or the movable structure so as to define and form at least a portion of the actuator housing, the amount of material that forms the body of the primary structure and/or the movable structure may, in some embodiments, be reduced, thereby reducing its weight. The primary and secondary structure can be made of metals, composites, of a combination of metal and composite. For metal structure, various types and approaches of forming of the primary structure and/or the movable structure and of defining at least a portion of the actuator housing therewithin may be employed including, for example, high precision machining, multiple degrees of freedom machining, forming, casting, bonding, and additive manufacturing including laser or ebeam welding, friction stir or linear welding, stereolithography (SLA) as well as other additive or net shape manufacturing processes. For composite structure, various types and approaches of forming the primary structure and/or the movable structure and of defining at least a portion of the actuator housing therewithin may be employed including, for example, autoclave composite forms, non-autoclave composite forms, thermal plastics forming, cocurred bonding, adhesive bonding, etc. Hybrid approaches include combinations of different composite and metal approaches.

As described, the entire actuator housing 22 may be machined into or otherwise formed by the primary structure and/or the movable structure so as to be disposed internally within the OML. Alternatively, a majority, but not the entirety, of the actuator housing may be machined into or otherwise formed by the primary structure and/or the movable structure. In this embodiment, an additional portion of the actuator housing, such as a cap, may be affixed to the majority of the actuator housing that was machined into or otherwise formed by the primary structure and/or the movable structure so as to further seal the internal cavity defined by the actuator housing from dust, moisture, etc., such as by capping off an access hole defined by the majority of the actuator housing that was machined into or otherwise formed by the primary structure and/or the movable structure following insertion of the actuation mechanism 20 into the internal cavity.

The actuation mechanism 20 is positioned, such as shown in the example embodiment of FIGS. 3 and 4, so as to be operably coupled to the movable structure. A portion of the actuation mechanism may be built into at least one of the primary structure and/or the movable structure in the same manner as the actuator housing 22. Alternatively, the actuation mechanism (or a portion of the actuation mechanism if another portion of the actuation mechanism has already been built into at least one of the primary structure and/or the movable structure) may be at least partially disposed within the actuator housing 22 so as to engage the portion of the actuator housing 22 that is built into the movable structure. As such, the actuation mechanism may be actuated in a controlled manner in order to controllably position the movable structure relative to the primary structure. By defining the movement of the actuation mechanism relative to the actuator housing which is built into the primary structure and/or the movable structure, the actuation mechanism may be repositioned and the movable structure may be correspondingly repositioned in a more controlled and precise manner with increased rigidity relative to discrete actuators mounted upon a primary structure. In this regard, the integrated actuator assembly of an example embodiment provides for improved reaction load paths since the entire aircraft structure is reacting out internal loads as well as improved stiffness characteristics.

Figure 5:
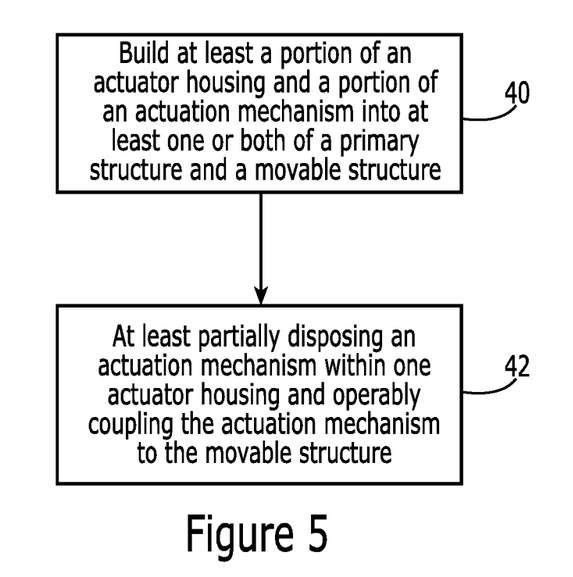
FIG. 5 is a flow chart illustrating operations performed in order to manufacture an actuator assembly of an air vehicle in accordance with an example embodiment of the present disclosure.

With reference to FIG. 5, a method of forming an actuator assembly of an air vehicle 10 is provided. As shown in block 40 of FIG. 5, the method includes building at least a portion of the actuator housing 22 and/or a portion of actuation mechanism 20 into the primary structure and/or the movable structure such that the actuator housing is within the outer mold line of the air vehicle. For example, portions of the actuator housing may be built into both the primary structure and the movable structure and the primary and movable structures may be positioned relative to one another such that the different portions of the actuator housing fit together to define the actuator housing. As shown in block 42, all or a portion of the actuation mechanism 20 may be at least partially disposed within the actuator housing and operably coupled to the movable structure. As such, the actuation mechanism may be commanded so as to cause the movable structure to be controllably positioned relative to the primary structure, such as by controllably positioning the different portions of the actuator housing relative to one another.

The air vehicle, actuator assembly and method of manufacture of an example embodiment therefore provide a structurally more efficient integration by integrating the actuator housing, the transmission, if any, and, in some embodiments, the actuator mechanism into the airframe structure in contrast to the conventional mechanical attachment of an actuator housing to the airframe at discrete attach points. In addition to providing improved reaction load paths and improved stiffness characteristics, the integrated actuator assembly of an example embodiment provides for geometric efficiencies relative to the mechanical attachment of an actuator housing to the airframe at discrete attach points. In addition, the integrated actuator assembly of an example embodiment may be more compact and take up less space relative to the redundant structure, discrete attach points and access requirements of a conventional actuator assembly. This more weight efficient compact integrated design may enable smaller and thinner shapes which may provide space for other systems or fuel as well as providing increased capabilities and performance. The benefits offered by embodiments of the air vehicle, actuator assembly and method of manufacture may lead to improved overall system performance, e.g., range, survivability, flight envelope, etc. since the outer mold line was not interrupted by the actuator assembly, more fuel may be carried, the aircraft weight may be reduced and/or the actuator assembly may be stiffer.

Many modifications and other aspects of the disclosure set forth herein will come to mind to one skilled in the art to which this disclosure pertains having the benefit of the teachings presented in the foregoing descriptions and the associated drawings. For example, the primary and movable structures may take many forms and have different functions, the actuation mechanisms could embodied other unique or expanded approaches, and the forming of the structural integrated actuator housing and actuation mechanism can utilize many different manufacturing and build approaches and processes. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An air vehicle comprising:
a primary structure;
a movable structure configured to be controllably moved about a rotation axis relative to the primary structure; and
an actuator assembly configured to cause the movable structure to be positioned relative to the primary structure, wherein the actuator assembly comprises:
an actuator housing; and
an actuation mechanism at least partially disposed within the actuator housing and configured to provide for relative movement between the primary structure and the movable structure;
wherein the actuator housing and the actuation mechanism comprise:
a plurality of rings; and
a plurality of gears, wherein the plurality of rings and the plurality of gears are spaced apart in an axial direction defined by the rotation axis and the plurality of rings are configured to interlace with the plurality of gears to define the actuator housing, wherein each ring and gear comprises:

a housing member; and an extension extending outwardly from the housing member and configured to be built into the primary structure or the movable structure; and wherein at least a portion of the actuator assembly is manufactured and built into at least one of the primary structure and the movable structure so as to be within an outer mold line of the air vehicle.

2. An air vehicle according to claim 1 wherein the primary structure comprises at least one of a wing, a horizontal tail, a vertical tail or an airframe body.

3. An air vehicle according to claim 1 wherein different portions of the actuator assembly are manufactured and built into both the primary structure and the movable structure.

4. An air vehicle according to claim 3 wherein the actuation mechanism also comprises a motor configured to interact with the plurality of gears in order to cause movement of the movable structure relative to the primary structure.

5. An air vehicle according to claim 1 wherein the actuator assembly is a rotary electromechanical actuator.

6. An actuator assembly for an air vehicle having a primary structure and a movable structure configured to be controllably positioned about a rotation axis relative to the primary structure, the actuator assembly comprising:

an actuator housing; and an actuation mechanism at least partially disposed within the actuator housing and configured to provide for relative movement between the primary structure and the movable structure, wherein the actuator housing and the actuation mechanism comprise a plurality of rings; and a plurality of gears, wherein the plurality of rings and the plurality of gears are spaced apart in an axial direction defined by the rotation axis and the plurality of rings are configured to interlace with the plurality of gears to define the actuator housing, wherein each ring and gear comprises a housing member; and an extension extending outwardly from the housing member and configured to be built into the primary structure or the movable structure, and wherein at least a portion of the actuator assembly is configured to be built into at least one of the primary structure and the movable structure so as to be within an outer mold line of the air vehicle.

7. An actuator assembly according to claim 6 wherein primary structure comprises at least one of a wing, a horizontal tail, a vertical tail or an airframe body.

8. An actuator assembly according to claim 6 wherein different portions of the actuator assembly are configured to be built into both the primary structure and the movable structure.

9. An actuator assembly according to claim 8 wherein the actuation mechanism also comprises a motor configured to interact with the plurality of gears in order to cause movement of the movable structure relative to the primary structure.

10. An actuator assembly according to claim 6 wherein the actuator assembly is a rotary electromechanical actuator.

11. A method of forming an actuator assembly of an air vehicle, the method comprising:

building at least a portion of the actuator assembly comprising an actuator housing and actuation mechanism into at least one of a primary structure and a movable structure of the air vehicle such that the actuator assembly is within an outer mold line of the air vehicle, wherein the actuator housing and the actuation mechanism comprise a plurality of rings; and a plurality of gears, wherein the plurality of rings and the plurality of gears are spaced apart in an axial direction defined by a rotation axis and the plurality of rings are configured to interlace with the plurality of gears to define the actuator housing, wherein each ring and gear comprises a housing member; and an extension extending outwardly from the housing member and configured to be built into the primary structure or the movable structure; and at least partially disposing at least a portion of the actuation mechanism within the actuator housing and operably coupling the actuation mechanism to the movable structure such that the actuation mechanism is configured to cause the movable structure to be positioned about the rotation axis relative to the primary structure.

12. A method according to claim 11 wherein the primary structure comprises at least one of a wing, a horizontal tail, a vertical tail or an airframe body.

13. A method according to claim 11 wherein building at least a portion of an actuator assembly into at least one of a primary structure and a movable structure comprises building different portions of the actuator assembly into both the primary structure and the movable structure.

14. A method according to claim 13 wherein the actuation mechanism also comprises a motor configured to interact with the plurality of gears in order to cause movement of the movable structure relative to the primary structure.

15. A method according to claim 11 wherein the actuator assembly is a rotary electromechanical actuator.

* * * * *